(12) United States Patent
Abramov et al.

(10) Patent No.: US 9,624,121 B2
(45) Date of Patent: Apr. 18, 2017

(54) METHODS AND APPARATUS FOR FREE-SHAPE CUTTING OF FLEXIBLE THIN GLASS

(71) Applicant: CORNING INCORPORATED, Corning, NY (US)

(72) Inventors: Anatoli Anatolyevich Abramov, Painted Post, NY (US); Bernd Christoph Hoetzel, Wallertheim (DE)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/989,369

(22) Filed: Jan. 6, 2016

(65) Prior Publication Data

US 2016/0115069 A1     Apr. 28, 2016

Related U.S. Application Data

(62) Division of application No. 14/296,822, filed on Jun. 5, 2014, now Pat. No. 9,260,337.
(Continued)

(51) Int. Cl.
*C03B 33/03* (2006.01)
*C03B 33/04* (2006.01)
*C03B 33/09* (2006.01)

(52) U.S. Cl.
CPC ............ *C03B 33/091* (2013.01); *C03B 33/03* (2013.01); *C03B 33/04* (2013.01); *B65G 2249/04* (2013.01); *Y02P 40/57* (2015.11)

(58) Field of Classification Search
CPC ... C03B 33/091; C03B 33/102; C03B 33/027; C03B 33/04
See application file for complete search history.

(56) References Cited

U.S. PATENT DOCUMENTS 4,467,168 A     8/1984  Morgan et al.
4,702,664 A    10/1987  Lukens, Jr.
(Continued)

FOREIGN PATENT DOCUMENTS

DE     4305107 C2     2/1995
DE     4411037 C2     7/1995
(Continued)

OTHER PUBLICATIONS

International Search Report and Written Opinion of the International Searching Authority; PCT/US2015/010254; Mailed Apr. 7, 2015, 15 Pages.

*Primary Examiner* — Jason L Lazorcik
(74) *Attorney, Agent, or Firm* — Jeffrey A. Schmidt

(57) ABSTRACT

Methods and apparatus provide for supporting a source glass sheet and defining an at least partially non-straight cutting line that establishes a closed pattern that circumscribes a desired final shape; scoring the glass sheet at an initiation line using a mechanical scoring device; applying a laser beam to the glass sheet starting at the initiation line and continuously moving the laser beam relative to the glass sheet along the cutting line to elevate a temperature of the glass sheet at the cutting line to a substantially consistent temperature, where the laser beam is of a circular shape; and applying a cooling fluid simultaneously with the application of the laser beam, such that the cooling fluid at least reduces the temperature of the glass sheet in order to propagate a fracture in the glass sheet along the cutting line.

5 Claims, 6 Drawing Sheets

Related U.S. Application Data

(60) Provisional application No. 61/925,308, filed on Jan. 9, 2014.

(56) References Cited

U.S. PATENT DOCUMENTS

| | | | |
|---|---|---|---|
| 5,207,414 A | 5/1993 | Schimanski et al. | |
| 5,237,150 A * | 8/1993 | Karube | B23K 26/0643 219/121.72 |
| 5,836,224 A | 11/1998 | Gerber | |
| 5,916,460 A * | 6/1999 | Imoto | B23K 26/12 219/121.67 |
| 5,984,159 A | 11/1999 | Ostendarp et al. | |
| 6,112,967 A | 9/2000 | Ostendarp et al. | |
| 6,327,875 B1 | 12/2001 | Allaire et al. | |
| 6,502,423 B1 | 1/2003 | Ostendarp et al. | |
| 6,800,831 B1 | 10/2004 | Hoetzel | |
| 7,014,082 B2 * | 3/2006 | Hauer | B23K 26/073 219/121.72 |
| 7,919,724 B2 * | 4/2011 | Huang | B23K 26/38 219/121.67 |
| 8,035,901 B2 | 10/2011 | Abramov et al. | |
| 8,171,753 B2 | 5/2012 | Abramov et al. | |
| 8,258,427 B2 | 9/2012 | Abramov et al. | |
| 2010/0102042 A1 | 4/2010 | Garner et al. | |
| 2010/0294748 A1 * | 11/2010 | Garner | C03B 33/0215 219/121.72 |
| 2011/0049764 A1 | 3/2011 | Lee et al. | |
| 2011/0197634 A1 | 8/2011 | Eta | |
| 2012/0047956 A1 | 3/2012 | Li | |
| 2012/0135847 A1 * | 5/2012 | Fukasawa | B28D 1/221 501/11 |
| 2012/0211923 A1 * | 8/2012 | Garner | C03B 33/04 264/400 |
| 2013/0291598 A1 * | 11/2013 | Saito | B23K 26/0057 65/112 |
| 2014/0027951 A1 * | 1/2014 | Srinivas | B29C 59/16 264/400 |
| 2014/0165652 A1 * | 6/2014 | Saito | C03B 33/04 65/28 |
| 2014/0352358 A1 * | 12/2014 | Washko, Jr. | C03B 33/091 65/112 |
| 2015/0114044 A1 * | 4/2015 | Saito | C03B 33/07 65/102 |
| 2015/0183679 A1 * | 7/2015 | Saito | C03B 33/04 65/112 |
| 2015/0209911 A1 * | 7/2015 | Yamada | B23K 26/38 219/121.67 |

FOREIGN PATENT DOCUMENTS

| | | |
|---|---|---|
| DE | 19830237 C2 | 10/2001 |
| DE | 10001292 C1 | 11/2001 |
| DE | 10004876 C2 | 12/2003 |
| DE | 102007018674 A1 | 10/2008 |
| FR | 2961731 A1 | 12/2011 |
| JP | 1998166170 A | 6/1998 |
| JP | 2007090860 A | 4/2007 |
| JP | 2009078502 A | 4/2009 |
| JP | 2009242184 A | 10/2009 |
| KR | 2007068248 A | 6/2007 |
| KR | 20100048206 A | 5/2010 |
| WO | 9320015 A1 | 10/1993 |
| WO | 9620062 A1 | 7/1996 |
| WO | 0002700 A1 | 1/2000 |
| WO | 2006010289 A2 | 2/2006 |
| WO | 2007142264 A1 | 12/2007 |
| WO | 2008126501 A1 | 10/2008 |
| WO | 2011162392 A1 | 12/2011 |
| WO | 2012075097 A1 | 6/2012 |
| WO | 2013119737 A2 | 8/2013 |

* cited by examiner

10

METHODS AND APPARATUS FOR FREE-SHAPE CUTTING OF FLEXIBLE THIN GLASS

CROSS-REFERENCE TO RELATED APPLICATIONS

This application is a divisional of and claims the benefit of priority to U.S. patent application Ser. No. 14/296,822, filed on Jun. 5, 2014, which in turn, claims the benefit of priority of U.S. Provisional Patent Application Ser. No. 61/925,308, filed on Jan. 9, 2014, the contents of each of which are relied upon and incorporated herein by reference in their entireties.

BACKGROUND

The present disclosure relates to methods and apparatus for fabricating flexible thin glass into free-form shapes.

Conventional manufacturing techniques for cutting flexible plastic substrates have been developed, where the plastic substrates employ a plastic base material laminated with one or more polymer films. These laminated structures are commonly used in flexible packaging associated with photovoltaic (PV) devices, organic light emitting diodes (OLED), liquid crystal displays (LCD) and patterned thin film transistor (TFT) electronics, mostly because of their relatively low cost and demonstrably reliable performance.

Although the aforementioned flexible plastic substrates have come into wide use, they nevertheless exhibit poor characteristics in connection with at least providing a moisture barrier and providing very thin structures (indeed, the structures are relatively thick owing to the properties of plastic materials).

Accordingly, there are needs in the art for new methods and apparatus for fabricating a flexible substrate for use in, for example, PV devices, OLED devices, LCDs, TFT electronics, etc., particularly where the substrate is to provide a moisture barrier and the substrate is to be formed into a free-form shape.

SUMMARY

The present disclosure relates to employing a relatively thin, flexible, glass sheet (on the order of less than about 0.3 mm) and cutting the glass sheet into a free form shape.

Flexible glass substrates offer several technical advantages over the existing flexible plastic substrate in use today. One technical advantage is the ability of the glass substrate to serve as good moisture or gas barrier, which is a primary degradation mechanism in outdoor applications of electronic devices. Another advantage is the potential for the flexible glass substrate to reduce the overall package size (thickness) and weight of a final product through the reduction or elimination of one or more package substrate layers. As the demand for thinner, flexible substrates (on the order of less than about 0.3 mm thick) increases in the electronic display industry, manufacturers are facing a number of challenges for providing suitable flexible substrates.

Although techniques exist for the continuous cutting of ultra-thin glass web, for example glass web measuring less than about 0.3 mm thick, such techniques are directed to cutting the glass web into straight strips of particular widths. Conventional approaches for cutting the glass web, however, have not provided for the ability to cut arbitrarily free form shapes.

A significant challenge in fabricating flexible glass substrate for PV devices, OLED devices, LCDs, TFT electronics, etc., is cutting a source of relatively large, thin glass sheet into smaller discrete substrates of various dimensions and shapes with tight dimensional tolerances, good edge quality, and high edge strength. Indeed, a desired manufacturing requirement is to cut glass parts off a source glass sheet continuously, without interruption of the cutting line, where the cutting line includes at least some round sections (e.g., for rounded corners), possibly of varying radii. Although existing mechanical techniques for continuous cutting of irregular (free form) shapes provide for scoring (with a score wheel) and mechanical breaking (or snapping), the edge quality and strength achieved by such mechanical techniques are not sufficient for many applications where precision is required. Indeed, the mechanical scoring and breaking approach generates glass particles and manufacturing failures, which decreases the process yield and increases manufacturing cycle time.

In accordance with one or more embodiments herein, a laser cutting technique is employed to cut a thin glass sheet into a free form shape. Glass cutting techniques using a laser are known, however, such techniques are directed to cutting glass sheets having thicknesses of at least 0.4 mm and thicker—and the technique involves laser scoring followed by mechanical breaking (score and snap). The cutting of thin flexible glass with thicknesses of less than about 0.3 mm presents significant challenges, especially when tight dimensional tolerances and high edge strength are required manufacturing objectives. The conventional laser score and mechanical break process is nearly impossible to reliably employ with glass sheet thicknesses of less than about 0.3 mm, and especially of less than about 0.2 mm. Indeed, due to the relatively thin profile of a glass sheet of less than about 0.3 mm, the stiffness of the sheet is very low (i.e., the sheet is flexible), and the laser score and snap cutting process is easily adversely affected by thermal buckling, mechanical deformation, air flows, internal stress, glass warpage, and many other factors.

In contrast, the embodiments herein present laser cutting techniques resulting in free form shapes of thin flexible glass, whereby a one-step full separation of the free form shape from the source glass sheet is achieved along virtually any trajectory, including closed contours. A continuous cutting trajectory may be established using a combination of any number of cutting lines having radii of curvature from a minimum of about 2 mm up to infinity (which is a straight line).

The novel methodology and apparatus provides for the propagation of a crack in the source glass sheet via a laser (for example a CO2 laser beam) and simultaneous provision of a cooling fluid (for example a gas, for example air). Initiation of the crack is achieved using a mechanical tool, preferably outside a perimeter of the desired cutting line. The methodology and apparatus is applicable to thin and ultra-thin glass sheets with thicknesses of less than about 0.3 mm, for example between about 0.03 mm to 0.3 mm, and/or between about 0.05 mm to 0.2 mm. Notably, cutting of thinner glass sheets is possible, and the cutting of thicker glass sheets (i.e., greater than about 0.3 mm) is also possible. Although the methodology is intended for a one step, full separation of the desired shape from a source glass sheet of less than about 0.3 mm, the technique may be adapted for cutting shaped parts from a glass sheet of thickness of greater than about 0.3 mm, using a score and break technique.

Advantages of the embodiments herein include: (i) producing free form glass shapes from thin and ultra-thin glass sheets with high edge quality and precision; (ii) the flexibility to cut various shapes and sizes; (iii) permitting a cut having a minimum radius of curvature of about 2 mm; (iv) reproducible and effective crack initiation and crack termination; (v) high edge strength and clean cutting process; (vi) very simple and low cost beam shaping optics, beam delivery optics, and power laser source; (vii) application to a wide range of glass thicknesses (including ultra-thin glass sheets).

Other aspects, features, and advantages will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments disclosed and described herein are not limited to the precise arrangements and instrumentalities shown.

DETAILED DESCRIPTION OF THE PREFERRED EMBODIMENTS

Figure 1:
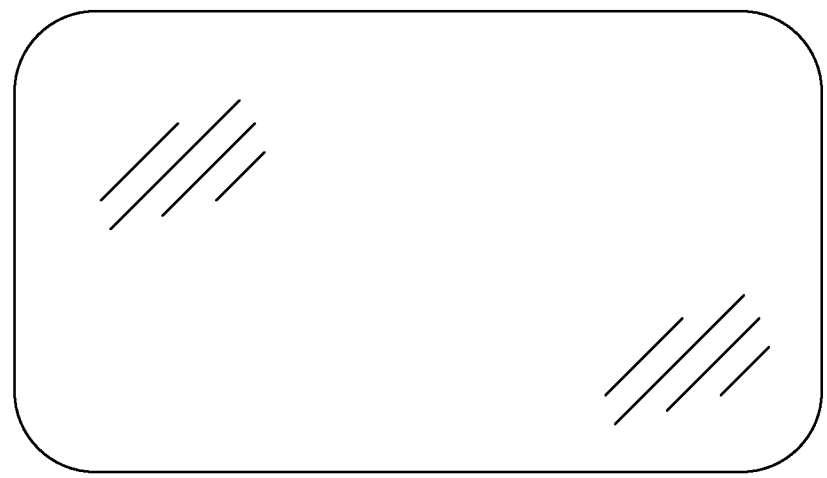
FIG. 1 is top view of a thin, glass substrate produced using one or more cutting methodologies and apparatus disclosed herein.

With reference to the drawings wherein like numerals indicate like elements there is shown in FIG. 1 a top view of a thin, glass substrate 10 produced using one or more cutting methodologies and apparatus disclosed herein. A number of characteristics of the glass substrate 10 are of importance when considering the disclosure herein. First, the glass substrate (and the source glass sheet from which it is cut) is thin and/or ultra-thin, with a thickness of less than about 0.3 mm, for example between about 0.03 mm to 0.3 mm, and/or between about 0.05 mm to 0.2 mm. While these thicknesses are considered preferable, and representative of thicknesses not heretofore usable in connection with existing free-form shape cutting techniques, the glass substrate 10 may be thinner and/or thicker than the ranges mentioned. Second, the glass substrate 10 is considered a free form shape, for example having at least one curved portion, and indeed potentially a plurality of curved portions, having one or more radii of curvature anywhere from a minimum of about 2 mm up to infinity (which is a straight line). For example, the glass substrate 10 is shown with four rounded corners, although any other shape may be employed, for example having a mix of rounded corners, sharp corners, straight beveled corners, etc. Third, the glass substrate 10 is intended to be formed via a one step, full separation cutting methodology in which the desired shape is obtained from a thin source glass sheet.

Figure 2:
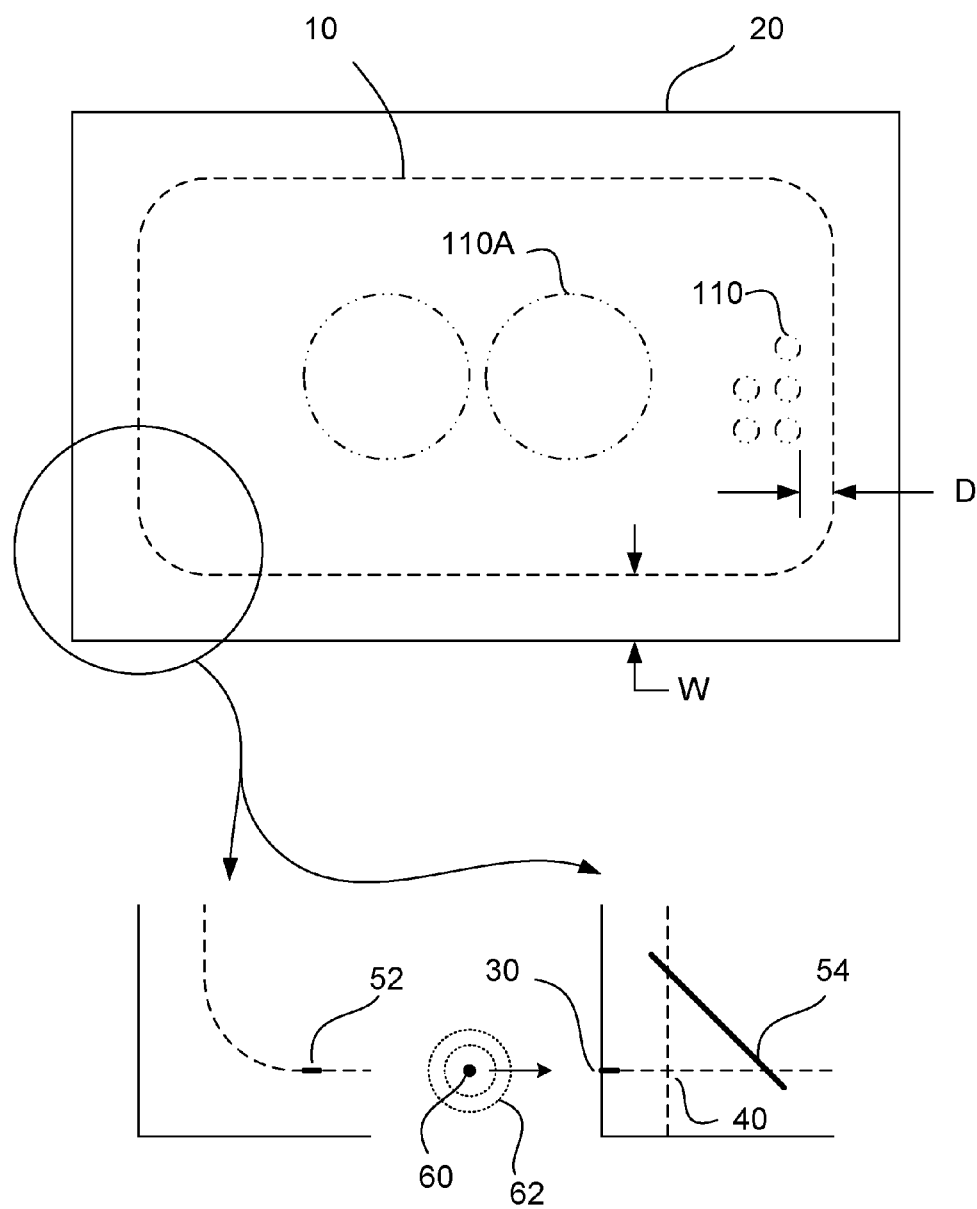
FIG. 2 is a top view of a source glass sheet from which the glass substrate of FIG. 1 may be produced.

Reference is now made to FIG. 2, which is a top view of a source glass sheet 20 from which the glass substrate 10 of FIG. 1 may be produced. The novel methodology and apparatus disclosed herein provides for cutting the glass substrate 10 via propagation of a crack in the source glass sheet using a laser for example a $CO_2$ laser beam) and simultaneous provision of a cooling fluid (for example a gas, for example air). In general, this arrangement results in the controlled propagation of the crack in the source glass sheet 20 along a desired cutting line in order to separate the glass substrate 10 from the glass sheet 20. A more detailed discussion of the methodology and apparatus for carrying out the initiation, propagation, and termination of the crack is provided later in this description.

As an initial phase of the process, the source glass sheet 20 (of the aforementioned thickness) is supported on a suitable support structure (which will be discussed in more detail later herein) and a free form cutting line (the dashed line in FIG. 2) is defined that establishes a closed pattern, where the cutting line circumscribes the desired final shape of the glass substrate 10.

As will be discussed in more detail later herein, there are a number of options for the start of the cutting line and the finish of the cutting line. For example, as illustrated in the encircled area of interest in FIG. 2, one option is that the start and finish 52 of the cutting line are co-incident (see the left most illustration). In this first configuration, the cutting line is entirely coincident with the desired contour of the glass substrate 10. Alternatively, the start 30 of the cutting line may be at a different point as compared to the finish 40 of the cutting line (see the right most illustration). In this second configuration, at least a portion of the cutting line is not coincident with the desired contour of the glass substrate 10. The implications for each option will be discussed later herein, however, at this point it is sufficient to point out that various options for the start/finish of the cutting line exist.

An additional parameter that may be considered in connection with defining the cutting line is the range of the waste width, W, i.e., the width of the waste material from the cutting line to the outer periphery of the source glass sheet 20 (usually measured perpendicularly from the cutting line). It has been discovered that the waste width parameter may have an appreciable effect on the edge quality of the finished glass substrate 10, although the waste width W may be expressed as a range instead of a particular single number.

As will be discussed in more detail later, the effect of the waste width parameter arises in connection with the structure supporting the glass sheet 20 during the cutting process. As will be discussed later herein, the support structure may include an air bearing mechanism to provide an air flow (from below) to counter the force of gravity on the glass sheet 20 in order to support (or float) the glass sheet 20. The air flow will also act (again from below) upon the waste portion of the glass sheet 20, represented by the waste width W. Notably, the waste portion may not have any counter force from above other than the force of gravity, and a source of cooling fluid (which will be discussed in detail later herein). In general, when the waste width W becomes too small, for example, about 5 mm for the thin glass thicknesses being contemplated, the waste portion of the glass sheet 20 is relatively light and is more susceptible to vibrations induced by air flows during the cutting process. Indeed, vibrations of the waste portion of the glass sheet 20 during cutting can lead to defect formation on the cut edge of the glass substrate 10. When the waste width W becomes too large, and the waste portion of glass sheet 20 becomes relatively heavy, the weight prevents expansion of the glass in the cutting zone during the cutting process, which may create an external compression force affecting propagation of the crack. It has been determined that the waste width, W, may vary within relatively large range of about 5-50 mm, about 15-40 mm, and/or about 20-25 mm (for about a 0.1 mm thick glass sheet 20)—without adversely impacting the edge quality of the cut glass substrate 10.

Another important parameter in connection with achieving suitable cut edge quality on the finished glass substrate 10 is the initiation of a crack over a small length on the glass sheet 20, which is subsequently picked up and propagated using the aforementioned laser cutting technique. In general, the glass sheet 20 is scored at an initiation line (the initial crack) using a mechanical scoring device, for example a score wheel. In order to appreciate the significance of the crack initiation and subsequent propagation of the crack, a more detailed discussion of the laser cutting technique will first be provided.

The laser is used to heat the glass sheet 20 in a localized area and then to rapidly cool that area in order to create transient tensile stress via the resultant temperature gradient. The aforementioned initial crack (initiation line) is created by introducing a small initial flaw on the surface of the glass sheet 20, which is then transformed into a vent (the crack) propagated by heating the localized zone via the laser and cooling that zone via quenching action produced by the cooling fluid. The tensile stress, $\sigma$, produced during the process is proportional to $\alpha*E*\Delta T$, where $\alpha$ is a linear thermal expansion coefficient of the glass sheet 20, E is a modulus of elasticity of the glass sheet 20, and $\Delta T$ is a temperature difference on the surface of the glass sheet 20 produced by the heating (from the laser) the cooling (from the fluid). The tensile stress is controlled in order to be higher than the molecular bonds of the glass sheet 20. For a given $\alpha*E$ tensile stress, $\sigma$ can be increased by heating the glass sheet 20 to a higher temperature via the laser. However, overheating the glass sheet 20 (above its strain point) will cause an ablation and irreversible high residual stress, which deteriorates the quality of the cut edge and reduces edge strength. The described method uses full body glass separation (cutting), where the vent depth is equal to the thickness of the glass.

Returning now to the issue of the initiation of the crack over a small length (the initiation line) on the glass sheet 20, a mechanical tool (a scoring device), for example a cutting wheel, may be used to produce a relatively short crack of sufficient depth in the surface of the glass sheet 20. As illustrated in FIG. 2, the left-most illustration of the encircled area of interest shows that an initial crack 52 may be placed at the start of the cutting line, where the cutting line is entirely on the desired contour of the desired glass substrate 10. Alternatively, as shown in the right-most illustration of the encircled area of interest shows that the initial crack 52 may be placed outside a perimeter of the desired contour (i.e., outside the perimeter of the final glass substrate 10), again at the start 30 of the cutting line. For the reasons discussed immediately below, it may be desirable to employ the latter approach to positioning the initial crack 52.

Indeed, an important issue to keep in mind concerning the location of the initiation of the crack 52 is that the mechanical damage to the glass sheet 20 by the mechanical action creates a defect or a short line of defects, which remains among the weakest section(s) of the cut edge of the glass substrate 10 after cutting. Another important issue is that application of the laser to heat the glass sheet 20 and initiation of separation results in the initial propagation of the crack, which becomes stable only after a certain distance from the initial crack 52. The length of the unstable section of the crack (and thus undesirable edge characteristics) varies depending on many factors, for example a size of the mechanical defect, the laser beam size, the laser power, the thickness of the glass sheet 20, etc. When a score and mechanical break process is used for cutting, the defect initiation sections are simply cut-off and left as glass waste. Thus, it is desirable to minimize the size of the unstable section of the crack (which cannot be removed) in order to reduce imperfections in the cut edge. One way to minimize the size of the unstable section of the crack is to employ a laser beam of certain characteristics, which will be discussed later herein.

Figure 3:
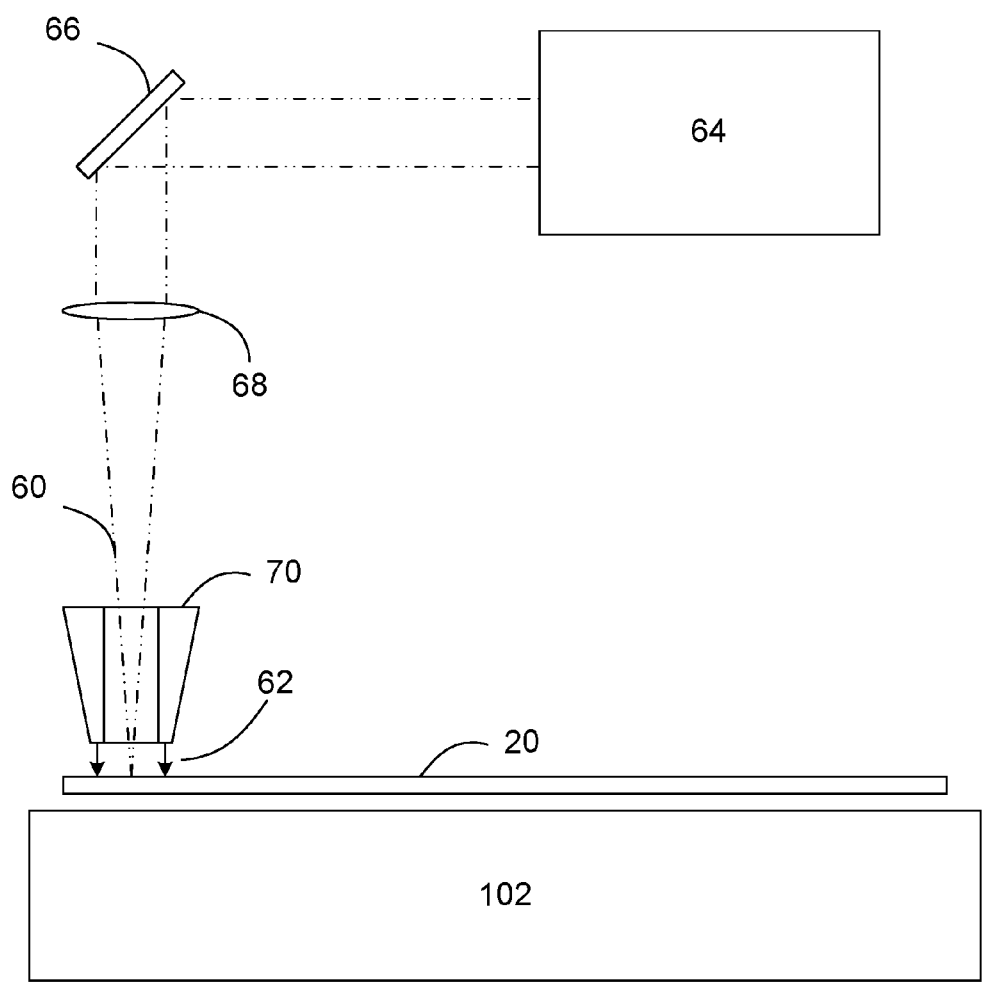
FIG. 3 is a schematic illustration of an apparatus that may be used to cut the glass substrate from the glass sheet.

Reference is now made to FIG. 2 and FIG. 3, the latter figure being a schematic illustration of an apparatus 100 that may be used to cut the glass substrate 10 from the glass sheet 20. The glass sheet 20 may be supported using a support structure 102 (which will be described in greater detail later herein). The laser beam 60 may be implemented using a source 64 of laser energy, folding optics 66, and focusing optics 68. Application of the laser beam 60 to the glass sheet 20 starting at the initiation line (the initial crack) initiates propagation of the crack. Continuous moving of the laser beam 60 relative to the glass sheet 20 along the cutting line elevates the temperature of the glass sheet 20 at the cutting line (preferably to a substantially consistent temperature). Simultaneously, the cooling fluid 62 is applied relative to the laser beam 60 (via a nozzle 70), such that the cooling fluid 62 causes a temperature differential in the glass sheet 20 in order to induce the aforementioned tensile stress and propagate the crack (i.e., a fracture or vent) in the glass sheet 20 along the cutting line. Movement of the laser beam 60 and nozzle 70 relative to the glass sheet 20 may be achieved through any of the known conveyance mechanisms.

Another important parameter in connection with achieving satisfactory cut edge quality on the finished glass substrate 10 is termination of the propagation of the crack, for example in the vicinity of a peripheral edge of the glass substrate 10, which may be seen at the finish 40 of the cutting line in FIG. 2 (right most illustration). When the laser beam 60 approaches the edge of the glass substrate 10, a leading edge of the laser beam 60 moves off the glass substrate 10, and therefore a portion of the energy of the laser beam 60 (i.e., in the leading section of the laser beam 60) does not contribute to maintaining the tensile stress required for stable crack propagation. The closer the laser beam 60 moves to the edge of the glass substrate 10, the more beam energy is lost. As a result, the crack propagation originally driven by the laser beam 60 stops and does not reach the edge of the glass substrate 10. Typically, the last section of the glass that fails to separate through crack propagation is completed by external forces, for example manual glass bending or pulling, which are usually not aligned with the original crack propagation direction, thereby causing a "hook" at the end of the cut. The length of the hook varies depending on a number of factors, is very undesirable, and therefore should be minimized in order to obtain satisfactory cut edge quality.

These two issues (crack initiation and crack termination) are addressed through a number of factors. First, it has been found that a particular combination of laser beam size, laser beam shape, and cooling fluid delivery affects the crack initiation, propagation, and termination in favorable ways. To appreciate the contemplated combination, a brief discussion of a traditional laser beam configuration is provided. In particular, the traditional configuration includes an elongated laser beam of various dimensions followed by the cooling fluid—where the source of the cooling fluid is positioned in an offset linear relationship (a trailing configuration) with respect to the elongate laser beam. This traditional arrangement (elongate laser beam and trailing coolant) is very efficient for straight laser cutting (or scoring), however, it does not allow for changing the direction of the crack propagation—and therefore no curved crack propagation is possible.

Turning again to FIGS. 2 and 3, it has been discovered that curved, free form laser cutting may be achieved using a laser beam 60 of a round shape surrounded by an annular, circular, ring-shaped coolant zone 62 (achieved using the coolant source nozzle 70). The circular laser beam 60, together with the annular coolant zone 62 does not exhibit any predefined or inherent orientation, and therefore can be used to propagate the crack in any direction (without having to use any complex beam shaping techniques or provide any additional motion axes for movement of the nozzle 70). While nozzles that produce annular, ring-shaped fluid flow in laser cutting applications are known, they have heretofore been applied to straight laser cutting methodologies or to cutting thicker glass via the score and break method (where a partial vent is created followed by mechanical break). In contrast, the embodiments herein employ a ring nozzle 70 for a full body separation (or cut) of a thin glass sheet 20. Additionally, while small diameter laser beams are also known for free form laser cutting, the embodiments herein apply a combination of the nozzle 70 for annular fluid flow (in stationary relationship to the laser beam 60), where the fluid flow is variable to achieve a variable annular coolant pattern, and of a small round laser beam 60. The diameter of the laser beam 60 is about 1-4 mm, preferably about 2 mm, with a Gaussian or flat-top beam power distribution.

The source of laser power 64 may be implemented using $CO_2$ laser mechanisms, however, other implementations are possible, for example a fiber laser, an Nd:YAG laser, or other laser systems. A carbon dioxide laser operates at the wavelength of 10.6 μm. In general, using a laser beam 60 having the diameters disclosed herein allows certain advantageous effects: (i) minimization of edge imperfections associated with the crack initiation (the smaller the beam diameter, the smaller the unstable crack propagation zone); (ii) ability to propagate the crack nearly to the edge of the glass sheet 20 (i.e., to permit termination of the crack in proximity to the edge of the glass sheet 20, thereby avoiding a hook at the end of the cut; and (iii) maintaining reasonably high cutting speed even with a small diameter beam, resulting in relatively short processing time and high throughput.

Referring to FIG. 2, as noted above, the initial crack (or initial line) may be applied to the surface of the glass sheet 20 along the cutting line at the start/finish thereof (see left-most illustration). It has been found, however, that better edge quality and strength of the glass substrate 10 may be achieved by placing the initial crack 52 at a location outside the cutting line and outside the closed pattern that circumscribes the desired final shape (see right-most illustration). In the illustrated example, the resulting shape of the glass substrate 10 may be a sharp corner since the cutting line crosses itself at the corner.

In an alternative embodiment, a termination line 54 may be applied to the surface of the glass sheet 20, for example by way of scoring or the like. The termination line 54 is applied in such a way as to cross the cutting line transversely at at least one place, for example the two places shown in the right-most illustration of FIG. 2. The termination line 54 may be used as a site for a score and snap technique to produce a straight chamfer at the corner of the glass substrate 10. Notably, the score and snap along the termination line 54 eliminates any imperfections from the crack initiation area 52 and the termination 40. Thus, this embodiment may be summarized as follows (in order): (i) mechanical scoring of the glass sheet 20 to apply the termination line 54 (for a chamfered corner), (ii) mechanical initiation (e.g., scoring) of the initial crack 52 at the start 30 at the edge of the glass sheet outside the closed pattern that circumscribes the desired final shape, (iii) application of laser beam 60 and cooling fluid 62 (continuously) for full body separation at the start 30 and at the site of the initial crack 52, extending along the cutting line outside the closed pattern, crossing the termination line 54 at a first location, continuing along the cutting line on the closed pattern, crossing the termination line 54 at a second location, continuing along the cutting line outside the closed pattern, and terminating at the finish 40, (iv) removing the glass waste and extracting the glass substrate 10, and (v) applying a mechanical (manual) break of chamfered corner (or corners if more than one termination line 54 is applied at various locations).

Another important parameter in connection with achieving satisfactory cut edge quality on the finished glass substrate 10 is controlling the temperature at the surface of the glass sheet 20 as the laser beam 60 (and the nozzle 70) move relative to the cutting line. It has been discovered that a substantially constant temperature is desirable; however, once a desired temperature is established, one must take steps to ensure such temperature may be controlled whilst the laser beam 60 is traversing a non-straight cutting line. Indeed, while the edge quality of a straight cut may be better when the cutting speed is relatively high, propagating the crack through arched regions (for example corners and the like), especially sections of small radii, requires a reduction of the cutting speed (i.e., a reduction in the relative speed of the laser beam 60 versus the cutting line). In order to ensure a relatively constant temperature through curved sections of the cutting line (i.e., where the relative speed of the laser beam 60 changes), the power of the laser beam 60 should be likewise changed (i.e., a reduction in power should accompany a reduction in speed). The controlled relationship between speed and power of the laser beam 60 relative to the cutting line should be maintained in order to ensure the constant temperature of the glass surface and resultant constant stress field induced by the heating/cooling.

Figure 4:
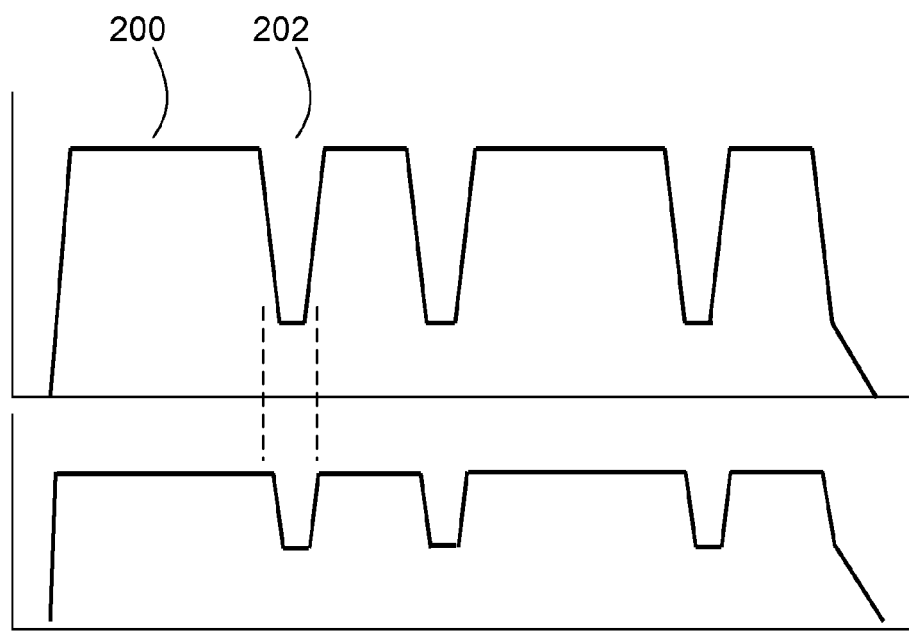
FIG. 4 is a graphical representation of speed and power curves versus time (or distance along the cutting contour from the starting point) suitable for use in connection with employing the apparatus of FIG. 3 to cut the glass substrate from the glass sheet.

Reference is now made to FIG. 4, which is a graphical representation of speed and power curves suitable for use in connection with employing the apparatus of FIG. 3 to cut the glass substrate 10 from the glass sheet 20. In the illustrated figure, the upper plot represents the speed of the laser beam 60 relative to the cutting line (e.g., in meters per minute) along the Y-axis and time (or distance from the starting point) along the X-axis. The lower plot represents the power of the laser beam 60 along the Y-axis and time (or distance from the starting point) along the X-axis. As noted above, higher laser beam translation speeds require higher laser power in order to maintain the required consistent temperature and stress, while lower beam translation speeds require lower laser power to maintain the required consistent temperature and stress. The plots of FIG. 4 illustrate suitable profiles for cutting the glass sheet 20 of FIG. 2, namely a rectangular shape with three round corners. The desired temperature (and therefore the cutting speed and laser power profiles) depends on a few factors, for example the laser beam diameter, the glass thickness, and other glass properties. As an example, a typical cutting speed for a glass sheet 20 formed from Corning® Eagle XG® glass (of 0.1 mm thickness) may be in the range of about 1-2 m/min for a straight cut, and about 0.2-0.4 m/min for corner cuts of about 2 mm radius. Larger corner radii will allow for faster speeds. The Laser power required to cut the glass sheet 20 of Corning Eagle XG glass may be about 5-15 W (which is a relatively low power level for a CO2 laser apparatus). As illustrated, the straight sections (e.g., 200) exhibit higher speed and power, while the curved sections (e.g., 202) exhibit lower speed and power.

Another important set of parameters in connection with achieving satisfactory cut edge quality on the finished glass substrate 10 is providing the functions of transporting the glass sheet 20 (into and out of the cutting zone of the apparatus 100) and holding the glass sheet 20 during the cutting process. In this regard, reference is made to FIG. 5, which is a schematic side view of an implementation of the support structure 102 of the apparatus 100 of FIG. 3. Assuming that the support structure 102 will be used for transportation, scoring, and laser cutting (which is a desirable combination), then the surface properties of the support structure 102 (especially the surface underneath the glass sheet 20), and the mechanisms contributing to the support of the glass sheet 20 during cutting are very important for cutting thin flexible glass of the thicknesses contemplated herein.

As for the mechanical scoring of the glass sheet 20 used for crack initiation and for creation of termination lines, the hardness of the surface of the support structure 102 under the glass sheet 20 is an important factor. Indeed, if the surface is too soft, then the glass sheet 20 will flex under the pressure from the scoring mechanism (e.g., the score wheel), which reduces and causes fluctuations in the force generated by the scoring mechanism and leads to inconsistent crack propagation and non-uniform initial crack depth. Thus, for the relatively thin glass sheet 20 it is preferred to have relatively hard surface supporting the glass sheet 20 during scoring, thereby reducing glass flexure and providing constant and repeatable force from the scoring mechanism. Again, assuming that the same support structure 102 is to be used to carry out the mechanical scoring processes and the laser cutting process (e.g., with a CO2 laser mechanism), then the surface of the support structure 102 should be able to withstand relatively high temperatures generated by the laser beam 60. Given these requirements, aluminum and/or stainless steel should be used to implement the surface of the support structure 102 under the glass sheet 20.

In order to move the glass sheet 20 into position for mechanical scoring and laser cutting, and then to move the glass substrate 10 (after the cutting process is complete) an air bearing mechanism is provided in the support structure 102. In addition, during the laser cutting process the glass sheet 20 must be held in position. Although commercially available pressure/vacuum tables with discrete air and vacuum holes are available, they are only suitable for glass with standard thicknesses (e.g., at least about 0.4 mm). In the case of the thin (or ultra-thin) flexible glass sheet 20 herein, the discrete air and vacuum ports in a commercially available pressure/vacuum table causes localized deformation of, and stress in, the glass sheet 20, which significantly disturb the mechanical scoring and laser cutting processes, often making satisfactory cutting impossible when the cutting line is close to one of the ports, or affecting edge quality, edge strength and/or edge geometry. Accordingly, the support structure 102 contemplated herein is not a common, commercially available pressure/vacuum table. Instead, a porous surface of the support structure 102 is preferably of an aluminum and/or stainless steel material, where the table provides: (i) an air-bearing mode for transportation of the glass sheet 20 (and the glass substrate 10), (ii) a vacuum mode (over the entire table) for holding the glass sheet 20 (e.g., during scoring), and (iii) an air-bearing mode combined with vacuum mode during laser cutting, whereby localized vacuum may be applied selectively through a pattern of vacuum zones, where vacuum is provided through the porous surface.

The air bearing mode is characterized by applying support fluid to one or more respective portions of the glass sheet 20 at least in proximity to the cutting line but preferable over a much larger area, and from a side (the underside) of the glass sheet 20 opposite to the cooling fluid 62 and the laser beam 60. The support fluid of the air bearing is delivered from the surface of the support structure 102 by way of the porosity of the surface and a source of fluid of varying pressure and flow (not shown). The air bearing mode operates to bias the glass sheet 20 away from the surface of the table of the support structure 20 as the laser beam 60 elevates the temperature of the glass sheet 20 and the cooling fluid 62 is directed in opposing fashion to the support fluid.

Figure 5:
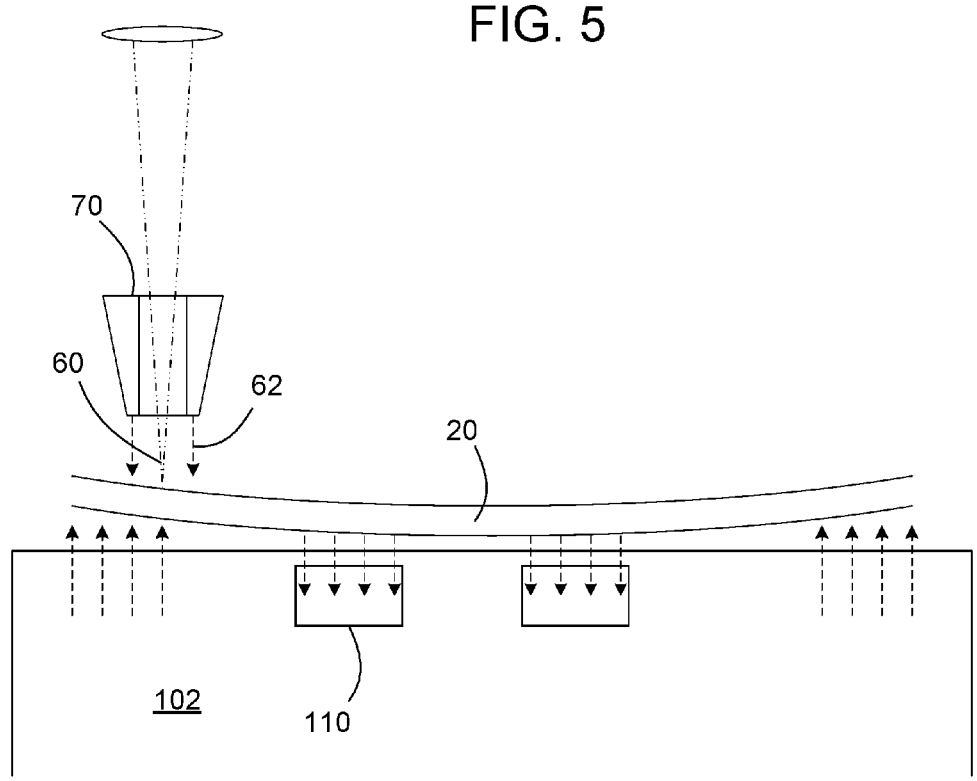
FIG. 5 is a schematic side view of a support structure suitable for use in connection with the apparatus of FIG. 3, for holding the glass sheet during the cutting process.

As illustrated in FIGS. 2 and 5, the vacuum mode provides for discrete vacuum zones 110 (only a few zones being shown for purposes of clarity), not discrete holes but areas of various dimensions and shapes (for example circular, rectangular, etc.). The vacuum zones 110 are best located within the closed pattern of the cutting line that circumscribes the desired final shape, such that they apply negative fluid pressure and negative fluid flow to the glass sheet 20, and bias and hold the glass sheet 20 toward the surface of the support structure 102 during application of the laser beam 60. A size of a circular vacuum zone 110 (as illustrated) may be 5-25 mm in diameter, however, different dimensions are possible depending on size and shape of the glass substrate 10. The number and location of the discrete vacuum zones 110 also depends on the size and shape of the glass sheet 20. The number of vacuum zones 110 will depend on the size of the zones 110 versus the size of the glass sheet 20. For relatively small vacuum zones, at least two vacuum zones may be needed to hold the glass sheet 20 and avoid translational movement and/or rotation during the cutting process. Alternatively, one or two larger vacuum zones 110A may be sufficient to provide the requisite holding function.

It is noted that the vacuum zones 110 will have an effect on the laser cutting process and the resultant edge characteristics of the glass substrate 10 because stress will be induced in the glass sheet 20 around the vacuum zones 110. For example, as shown in FIG. 5, the vacuum zones 110 tend to bias certain areas of the glass sheet 20 (in the vicinity of the zones 110) toward the surface of the support structure 102. In order to address the effect of the vacuum zones 110, one may be sure that the cutting line is located at a minimum distance D (see FIG. 2) from the borders of the vacuum zones 110. As an example, a safe minimum distance D may be about 25-50 mm for a glass thickness of about 0.1 mm.

Figure 6:
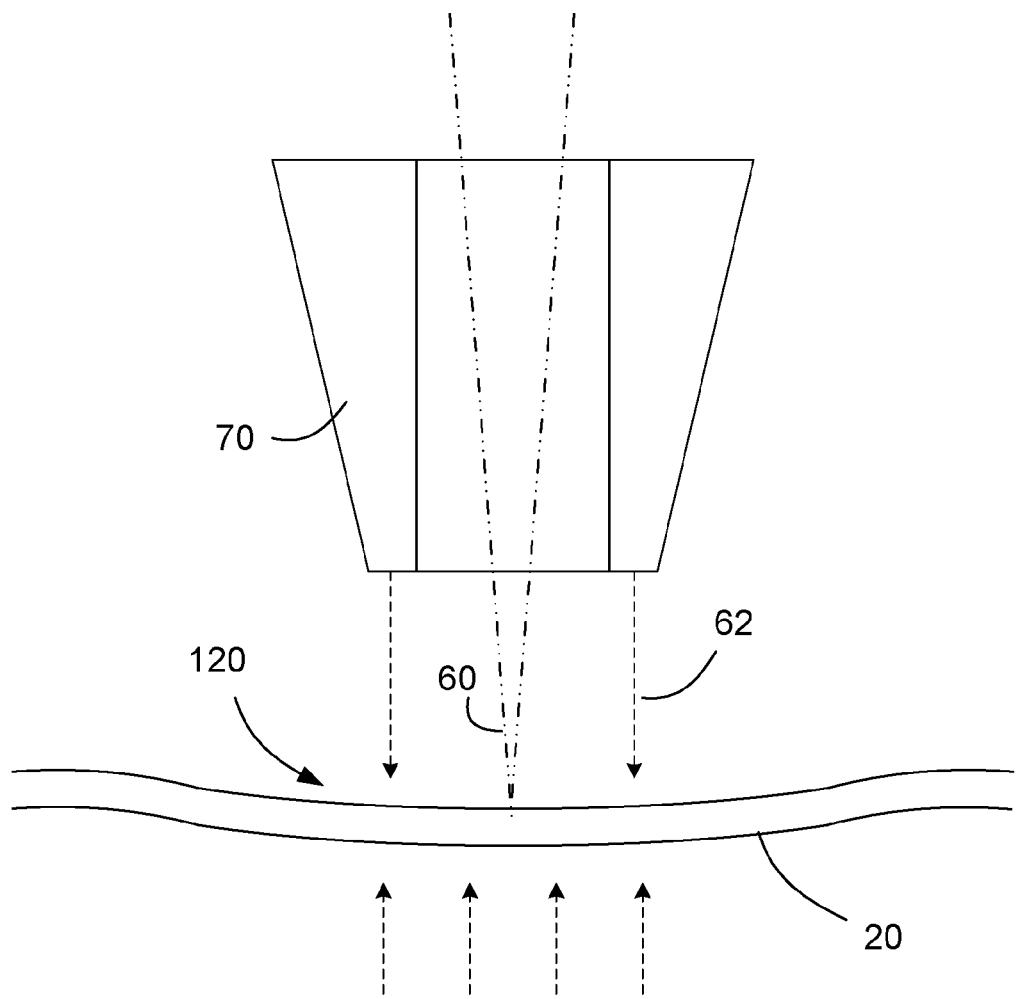
FIG. 6 is a schematic side view of a more localized portion of the support structure and glass sheet, showing effects of support fluid, the vacuum fluid, and/or cooling fluid.

Reference is now made to FIG. 6, which illustrates a localized side view of the effects of the combined air bearing and vacuum mode. This mode applies the support fluid (flow and positive pressure), the vacuum fluid (flow and negative pressure), and/or the cooling fluid (flow and opposing positive pressure) in order to provide a balanced mechanical support and localized orientation of the glass sheet 20 during propagation of the crack by the laser beam 60 and cooling fluid 62. Indeed, some or all of these sources of fluid flow may interact in such a way as to effect global and localized influences on the deformation of the glass sheet 20. As shown in FIG. 6, the interaction of the support fluid from beneath the glass sheet 20 and the cooling fluid from above the glass sheet 20, if balanced, may provide for a depression zone 120 (a mechanical deformation) around the laser beam 60, which forms a stress field around the cut. The stress field assists in stabilizing propagation of the crack.

Notably, while the cooling fluid is primarily provided for inducing a thermal differential in the glass sheet 20 (in opposition to the heat provided by the laser beam 60), the cooling fluid also provides a mechanical function contributing to the depression zone 120 (and resultant stress field) in the glass sheet 20. Similarly, although the primary function of the support fluid is to provide a mechanical function (in opposition to the force of gravity on the glass sheet 20), the support fluid also provides a thermal function contributing to the thermal differential in the glass sheet 20 (in opposition to the heat provided by the laser beam 60).

The speed and power of the laser depend on the thermal conditions of the bottom surface of the glass sheet 20, which is effected by the cooling that is at least partially provided by the support fluid. In addition, there is variability in heat dissipation from the bottom surface of the glass sheet 20 into the surface of the support structure 102 that depends on the float gap between the bottom surface of the glass sheet 20 and the surface of the support structure 102. The dissipation is maximized when the float gap is zero, i.e., when there is contact of the glass sheet 20 to the surface of the support structure 102. The float gap is primarily controlled by the support fluid, but the gap is also affected by the influence of the cooling fluid bearing down on the glass sheet 20 from above. Thus, higher laser power and/or lower speed might be required as the gap reduces, while lower laser power and/or higher speed might be required as the gap increases.

When the interrelationships between the support fluid, the cooling fluid, the laser power, and the laser speed are balanced, the depression zone 120 (and stress field), the gap, and the cooling effects of the fluids around the cut assist in stabilizing propagation of the crack and improving the edge characteristics of the finished glass substrate 10.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application. Example arrangements are set forth in the following aspects.

According to a first aspect, there is provided a method, comprising:

supporting a source glass sheet and defining an at least partially non-straight cutting line that establishes a closed pattern that circumscribes a desired final shape, where the glass sheet is 0.3 mm or less in thickness;

scoring the glass sheet at an initiation line using a mechanical scoring device;

applying a laser beam to the glass sheet starting at the initiation line and continuously moving the laser beam relative to the glass sheet along the cutting line to elevate a temperature of the glass sheet at the cutting line to a substantially consistent temperature, where the laser beam is of a circular shape;

applying a cooling fluid simultaneously with the application of the laser beam, such that the cooling fluid at least reduces the temperature of the glass sheet in order to propagate a fracture in the glass sheet along the cutting line; and separating waste glass from the glass sheet from the desired shape.

According to a second aspect, there if provided the method of aspect 1, wherein a diameter of the laser beam is one of: (i) between about 1 mm to about 4 mm, and (ii) 2 mm.

According to a third aspect, there is provided the method of aspect 1 or aspect 2, wherein one of: (i) the initiation line is applied on and along a portion of the cutting line; and (ii) the initiation line is applied to the glass sheet at a location outside the cutting line and outside the closed pattern that circumscribes the desired final shape.

According to a fourth aspect, there is provided the method of any one of aspects 1-3, further comprising scoring a termination line into the glass, where the termination line crosses the cutting line transversely at one of: (i) one place, and (ii) two places.

According to a fifth aspect, there is provided the method of aspect 4, wherein the termination line crosses the cutting line in two places and is a portion of the cutting line, resulting in the portion of cutting line being for a chamfered corner of the final desired shape.

According to a sixth aspect, there is provided the method of any one of aspects 1-5, further comprising varying a speed of the movement of the laser beam relative to the glass sheet such that the speed is higher when the cutting line is straight as compared with when the cutting line is curved.

According to a seventh aspect, there is provided the method of aspect 6, wherein at least one of: (i) the speed is between about 1-2 meters per minute when the cutting line is straight, and (ii) the speed is between about 0.2-0.4 meters per minute when the cutting line is curved.

According to an eighth aspect, there is provided the method of aspect 6, further comprising varying a power level of the laser beam as a function of the speed of the movement of the laser beam relative to the glass sheet such that the temperature of the glass sheet at the cutting line is maintained at the substantially consistent temperature irrespective of whether the cutting line is straight or whether the cutting line is curved.

According to a ninth aspect, there is provided the method of any one of aspects 1-8, further comprising:

applying one or more vacuum zones within the closed pattern that circumscribes the desired final shape to apply negative fluid pressure and negative fluid flow to the glass sheet and to bias and hold the glass sheet to a support table during application of the laser beam; and applying support fluid to one or more respective portions of the glass sheet in proximity to the cutting line, and from a side of the glass sheet opposite to the cooling fluid and the laser beam, to bias the glass sheet away from the table as the laser beam elevates the temperature of the glass.

According to a tenth aspect, there is provided the method of aspect 9, wherein each vacuum zone is a minimum of about 5 mm-25 mm in diameter.

According to an eleventh aspect, there is provided the method of aspect 9, further comprising controlling a fluid flow and pressure of the cooling fluid and a fluid flow and pressure of the support fluid to provide a balanced mechanical support of the glass sheet and cooling of the glass sheet to propagate the fracture of the glass sheet along the cutting line.

According to a twelfth aspect, there is provided the method of aspect 9, wherein the one or more vacuum zones are at least about 25-50 mm away from the cutting line.

According to a thirteenth aspect, there is provided the method of any one of aspects 1-12, wherein respective perpendicular distances from the cutting line to a closest edge of the glass sheet is one of: (i) between abut 5-50 mm; (ii) between abut 15-40 mm; and (iii) between abut 20-25 mm.

According to a fourteenth aspect, there is provided the method any one of aspects 1-13, wherein the cooling fluid is directed annularly about the laser beam toward the glass sheet.

According to a fifteenth aspect, there is provided an apparatus for cutting a glass sheet into a desired shape, comprising:

a support table operating to support the glass sheet, which is 0.3 mm or less, the glass sheet having a defined and at least partially non-straight cutting line that establishes a closed pattern that circumscribes the desired final shape;

a mechanical scoring device operating to score the glass sheet at an initiation line;

a laser source operating to apply a laser beam to the glass sheet starting at the initiation line and continuously moving the laser beam relative to the glass sheet along the cutting line to elevate a temperature of the glass sheet at the cutting line to a substantially consistent temperature, where the laser beam is of a circular shape;

a source of cooling fluid operating to apply a cooling fluid simultaneously with the application of the laser beam, such that the cooling fluid at least reduces the temperature of the glass sheet in order to propagate a fracture in the glass sheet along the cutting line such that waste glass may be separated from the glass sheet to result in the desired shape.

According to a sixteenth aspect, there is provided the apparatus of aspect 15, wherein a diameter of the laser beam is one of: (i) between about 1 mm to about 4 mm, and (ii) 2 mm.

According to a seventeenth aspect, there is provided the apparatus of aspect 15 or aspect 16, further comprising: a conveying device operating to vary a speed of the movement of the laser beam relative to the glass sheet such that the speed is higher when the cutting line is straight as compared with when the cutting line is curved.

According to an eighteenth aspect, there is provided the apparatus of any one of aspects 15-17, further comprising a power supply device operating to vary a power level of the laser beam as a function of the speed of the movement of the laser beam relative to the glass sheet such that the temperature of the glass sheet at the cutting line is maintained at the substantially consistent temperature irrespective of whether the cutting line is straight or whether the cutting line is curved.

According to a nineteenth aspect, there is provided the apparatus of any one of aspects 15-18, wherein the support table includes:

one or more vacuum zones, located within the closed pattern that circumscribes the desired final shape, operating to apply negative fluid pressure and negative fluid flow to the glass sheet and to bias and hold the glass sheet to the support table during application of the laser beam; and one or more sources of support fluid operating to apply the support fluid to one or more respective portions of the glass sheet in proximity to the cutting line, and from a side of the glass sheet opposite to the cooling fluid and the laser beam, to bias the glass sheet away from the table as the laser beam elevates the temperature of the glass, wherein a fluid flow and pressure of the cooling fluid and a fluid flow and pressure of the support fluid are controlled to provide a balanced mechanical support of the glass sheet and cooling of the glass sheet to propagate the fracture of the glass sheet along the cutting line.

According to a twentieth aspect, there is provided the apparatus of any one of aspects 15-19, wherein the cooling fluid is directed annularly about the laser beam toward the glass sheet.

According to a twenty first aspect, there is provided the apparatus of any one of aspects 15-20, wherein the cutting line is a minimum waste width, W, away from an outer periphery of the glass sheet, measured perpendicularly from the cutting line.

The invention claimed is:

1. An apparatus for cutting a glass sheet into a desired shape, comprising: a support table operating to support the glass sheet, which is 0.3 mm or less, the glass sheet having a defined and at least partially non-straight cutting line that establishes a closed pattern that circumscribes the desired final shape; a mechanical scoring device operating to score the glass sheet at an initiation line; a laser source operating to apply a laser beam to the glass sheet starting at the initiation line and continuously moving the laser beam relative to the glass sheet along the cutting line to elevate a temperature of the glass sheet at the cutting line to a substantially consistent temperature, where the laser beam is of a circular shape; a source of cooling fluid operating to apply a cooling fluid simultaneously with the application of the laser beam, such that the cooling fluid at least reduces the temperature of the glass sheet in order to propagate a fracture in the glass sheet along the cutting line such that waste glass may be separated from the glass sheet to result in the desired shape, wherein the support table includes: one or more vacuum zones, located within the closed pattern that circumscribes the desired final shape, operating to apply negative fluid pressure and negative fluid flow to the glass sheet and to bias and hold the glass sheet to the support table during application of the laser beam; and one or more sources of support fluid operating to apply the support fluid to one or more respective portions of the glass sheet in proximity to the cutting line, and from a side of the glass sheet opposite to the cooling fluid and the laser beam, to bias the glass sheet away from the table as the laser beam elevates the temperature of the glass, wherein a fluid flow and pressure of the cooling fluid and a fluid flow and pressure of the support fluid are controlled to provide a balanced mechanical support of the glass sheet and cooling of the glass sheet to propagate the fracture of the glass sheet along the cutting line.

2. The apparatus of claim 1, wherein a diameter of the laser beam is between about 1 mm to about 4 mm.

3. The apparatus of claim 1, further comprising: a conveying device operating to vary a speed of the movement of the laser beam relative to the glass sheet such that the speed is higher when the cutting line is straight as compared with when the cutting line is curved.

4. The apparatus of claim 1, further comprising a power supply device operating to vary a power level of the laser beam as a function of the speed of the movement of the laser beam relative to the glass sheet such that the temperature of the glass sheet at the cutting line is maintained at the substantially consistent temperature irrespective of whether the cutting line is straight or whether the cutting line is curved.

5. The apparatus of claim 1, wherein the cooling fluid is directed annularly about the laser beam toward the glass sheet.

\* \* \* \* \*